United States Patent [19]

Hill et al.

[11] Patent Number: 5,109,443
[45] Date of Patent: Apr. 28, 1992

[54] DETECTION OF STRESS APPLIED TO AN OPTICAL FIBER

[75] Inventors: Godfrey R. Hill, Ipswich; Ian W. Stanley, Tuddenham St Martin; Kenneth I. White, Ipswich, all of England

[73] Assignee: British Telecommunication public limited company, London, England

[21] Appl. No.: 435,401

[22] PCT Filed: Mar. 10, 1989

[86] PCT. No.: PCT/GB89/00248

§ 371 Date: Nov. 13, 1989

§ 102(e) Date: Nov. 13, 1989

[87] PCT Pub. No.: WO89/08954

PCT Pub. Date: Sep. 21, 1989

[30] Foreign Application Priority Data

Mar. 11, 1988 [GB] United Kingdom ............. 8805844

[51] Int. Cl.$^5$ ............................................. G02B 6/16
[52] U.S. Cl. ...................... 385/13; 359/116; 359/124; 359/900; 250/227.14
[58] Field of Search .............. 350/96.15, 96.16, 96.29, 350/96.30, 320; 250/227.14, 227.15, 227.16, 227.18

[56] References Cited

U.S. PATENT DOCUMENTS

| | | | |
|---|---|---|---|
| 4,162,397 | 7/1979 | Bucaro et al. | 350/96.29 X |
| 4,352,565 | 10/1982 | Rowe et al. | 350/96.15 X |
| 4,410,236 | 10/1983 | Schiffner | 350/96.15 X |
| 4,525,626 | 6/1985 | Kush et al. | 350/96.29 X |
| 4,768,851 | 9/1988 | Shaw et al. | 350/96.15 |
| 4,904,050 | 2/1990 | Dunn et al. | 350/96.29 |
| 4,973,169 | 11/1990 | Slonecker | 350/96.16 |

FOREIGN PATENT DOCUMENTS 3417644 11/1985 Fed. Rep. of Germany.
79/00377 6/1979 World Int. Prop. O..

OTHER PUBLICATIONS

Applied Optics, vol. 20, No. 2, Jan. 15, 1981, (New York, US), N. Lagakos et al: "Multimode Optical Fiber Displacement Sensor", pp. 167–168.
Applied Optics, vol. 22, No. 23, Dec. 1, 1983, (New York, US), D. R. Hjelme et al: "Microbending and Modal Noise", pp. 3874–3879.
Sixth European Conference on Optical Communication, York, Sep. 16–19, 1980, IEE, (London, GB), E. G. Rawson et al: "Experimental and Analytical Study of Modal Noise in Optical Fibers", pp. 72–75.
Leung et al, "Optical Fiber Line Sensor Based on Speckle Detection", Proc. of 1986 Int. Carnshan Conf. on Sec. Technology, Gothenburg, Sweden, Aug. 12–14, 1986, pp. 125–129.
Chen et al, "Integrated Communication and Sensing System Using One Single-Mode Optical Fiber", Electronics Letters, Jun. 23, 1988, vol. 24, No. 13, pp. 790–792.

Primary Examiner—John D. Lee
Attorney, Agent, or Firm—Nixon & Vanderhye

[57] ABSTRACT

Shocks or sudden stresses caused by attempts to tap into an optical fiber network are detected by monitoring the "speckle pattern" produced by intermodal interference at the output of a multimode fiber. The fiber is a single mode optical fiber communication link through which a monitoring beam having a wavelength at which the fiber supports multiple propagation modes is also transmitted.

10 Claims, 1 Drawing Sheet

DETECTION OF STRESS APPLIED TO AN OPTICAL FIBER

FIELD OF THE INVENTION

This invention relates to a method and apparatus for detecting changes in stress applied to an optical fibre, and particularly but not exclusively to a method and apparatus for detecting stresses applied to such fibres by movements caused for example by attempts to tap into such fibres in optical communication systems; and to systems incorporating such apparatus or employing such a method.

BACKGROUND OF THE INVENTION

The unauthorised tapping of communication systems is a problem of concern to commercial and financial interests. When the first optical fibre systems were deployed it was throught that clandestine access to the optical signal in the fibre would be virtually impossible. More recent developments in fibre handling and techniques for injecting and extracting optical signals from the fibre have lead to concern that optical tapping could be possible without the system operator readily becoming aware of it.

SUMMARY OF THE INVENTION

It is an object of the invention to provide a method and apparatus for detecting such attempts. Accordingly there is provided a method of detecting changes in stress applied to an optical fibre, comprising the steps of:

transmitting through an optical fiber communication link adapted to convey a data-carrying light beam in a single mode an electromagnetic signal having a wavelength at which the fibre supports propagation in a plurality of modes; and detecting changes in the interference pattern produced at an output of the fibre by the interaction of said modes.

According to a second aspect of the present invention there is provided monitoring apparatus for detecting movement of an optical fibre, comprising means adapted for coupling an electromagnetic signal into an optical fibre communication link adapted to convey a data-carrying light beam in a single mode an electromagnetic signal having a wavelength at which the fibre supports propagation in a plurality of modes and means for detecting changes in the interference pattern produced at an output of the fibre by the interaction of said modes.

BRIEF DESCRIPTION OF THE DRAWINGS

The invention will now be described with reference to the drawings, in which.

DETAILED DESCRIPTION OF THE DRAWINGS

Multimode fibres are so called because the optical energy passing along the fibre is distributed between a large number of optical paths or 'modes'. The energy distribution between the modes depends on the distance travelled in the fibre because transfer from one mode to another can arise at joints, connectors, bends and from stresses imposed by the surroundings of the fibre. The method of the present invention is based on the monitoring of part or all of the emergent interference pattern from a fibre which allows the transmission of more than one optical mode. A fibre intended for single mode operation in a particular wavelength band is monitored at a shorter wavelength where its waveguiding properties allow more than one mode to propagate. At a multimode wavelength the fibre may pass from two to many hundreds of individual modes.

On emerging from the fibre, the relative phases of the various modes constructively or destructively interfere in a complex way to produce an interference pattern that can be observed, when using visible light, by imaging it onto a screen with a lens. The interference pattern so produced is sometimes called a speckle pattern. A speckle pattern is also produced by non-visible electromagnetic radiation.

The speckle pattern consists of random, alternating high and low intensities whose distribution on the screen changes in response to disturbances in the fibre. The overall energy remains constant but in a selected part of the field of view (10% for example although other portions may be chosen) the energy will, it has been found by the applicant, increase or decrease as the stresses imposed on the fibre vary. A photodetector, for example a silicon or III–V compound PIN diode with suitable amplification, registers an optical energy which appears as a noise signal with a typical time average level. If part of the fibre being monitored is subject to a change in stress, as it would be in an attempt to extract a signal from it at some point in the transmission path, then the modal balance is the fibre is altered and the speckle pattern changes. In the pattern area being monitored, the average noise signal increases or decreases abruptly. Such a change, indicative of attempted tapping, is registered by the detector and arranged to alert the operator of the system.

By optical in this application is meant any electromagnetic signal capable of being guided by an optical fibre waveguide and in particular is not restricted to wavelengths visible to the human eye.

Figure 1:
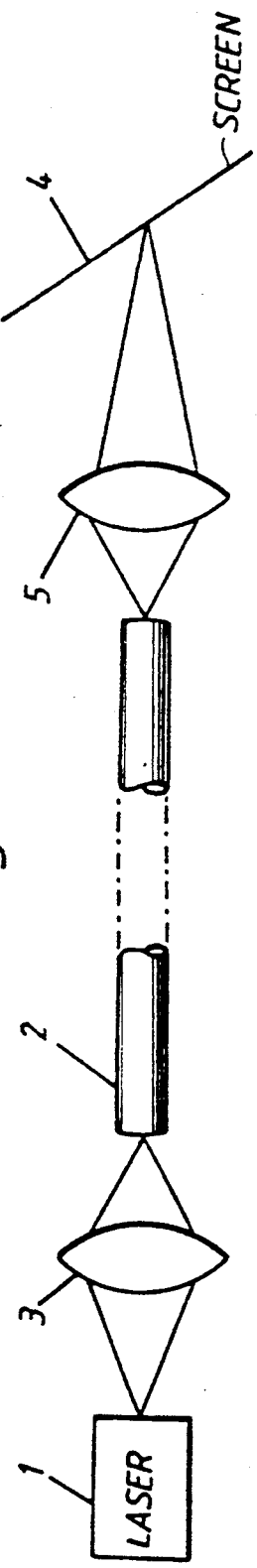
FIG. 1 is a schematic diagram of an experimental arrangement illustrating the general principle of operation of the invention.

Referring to FIG. 1, the light from a laser 1 is coupled into the fibre 2 using a lens 3. In this instance a helium-neon gas laser was used although semiconductor, crystal or other types would also be suitable. After passing through the fibre 2, the optical output is imaged on the screen 4 using a second lens 5. When the fibre 2 is disturbed, for example by being touched, the distribution of light in the interference patterns undergoes a sudden change. In this simple embodiment, the laser 1 emits at a visible wavelength and the change is readily detectable by the human eye.

Figure 2:
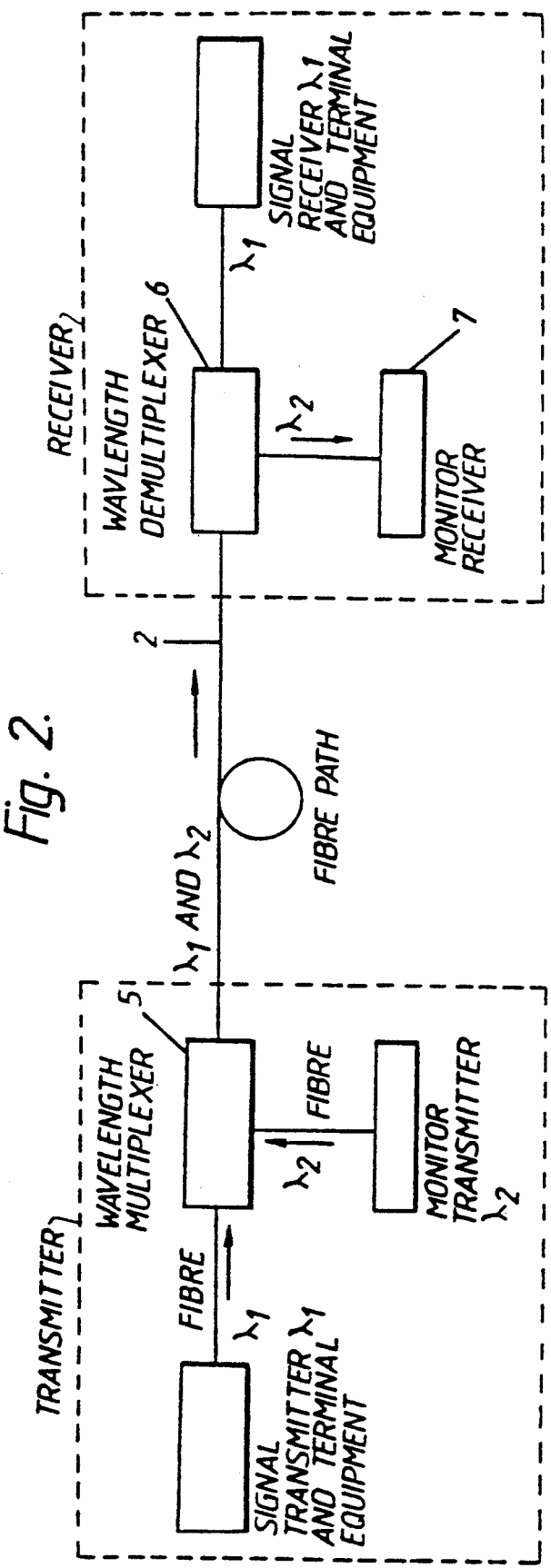
FIG. 2 is a schematic diagram of a data transmission system according to the invention.

Referring to FIG. 2, in an operational optical communications system, the monitored wavelength $\lambda_2$ is preferably in the infra-red above the visible spectrum and a photodetector of the type described above, or an alternative, would be necessary. In this instance the monitoring signal $\lambda_2$ is formed by a laser transmitter 1 and multiplexed onto the fibre 2 by a wavelength multiplexer 5. It then passes along the fibre 2 and is extracted by a wavelength demultiplexer 6 at the receiving terminal, and a part of the speckle pattern is monitored by a monitor receiver 7 which comprises an imaging lens and a photodetector arranged to receive part of the image as discussed above.

Other methods of implementation are also possible, including the use of the transmitted signal itself where the fibre is a multimode fibre at the signal wavelength $\lambda_1$.

Various factors other than attempted interferences may also cause changes in the fibre, for example thermal expansion and contraction and vibration caused by environment such as the passage of traffic. In order to eliminate consideration of changes due to these factors the speckle pattern may be monitored by a microprocessor forming part of the monitor 7 which revises the reference value taking into account changes in temperature, traffic flow conditions and other variations related to external conditions or following predictable patterns. For example, of ambient temperature increases this can be monitored directly or, as will be necessary if the change in temperature occurs at a part of the transmission line remote from the microprocessor or any related sensor, the microprocessor will take into account comparatively slow and steady changes in the detected noise level and recognise this as a temperature variation pattern and revise the reference value. Likewise vibration patterns caused by traffic will be recognisable both from time of day expectation levels and from the magnitude of the shifts. In contrast to this in order to tap into a fibre transmission line it is necessary to expose the fibre in order to couple it to a tapping fibre and this operation necessarily disturbs the fibre to a much greater extent than mere vibration because the duct carrying the fibre package and the fibre package itself have to be opened up. This type of disturbance would not follow a recognisable or expected regular pattern and the microprocessor would be arranged to shut down the communication channel or provide other indications that unusual tampering may have occurred for example a visual or audible alarm. In some locations the vibration pattern caused by approach to the fibre without actual handling may be sufficiently different from normal ambient conditions to raise an alert condition.

In the system described so far the monitoring signal has been transmitted along the same fibre as the data. In practice it is usual for a transmission line package to include several separate optical fibres and as these packages are sealed the whole package is disturbed when access to a component fibre is made, so that a monitor signal carried by one fibre in a package provides surveillance for the whole package. The technique may also be utilised as just a disturbance monitor without data transmission. In some instances greater sensitivity may be achieved by reducing the extent of packaging around a portion of fibre so as to render it more sensitive to its environment, and especially to vibration caused by approach.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. Monitoring apparatus for detecting movement of an optical fibre comprising:
   an optical demultiplexer coupled to said optical fibre for demultiplexing electromagnetic signals at a first and a second wavelength ($\lambda_1$, $\lambda_2$),
   the electromagnetic signals at said first wavelength ($\lambda_1$) propagating in a single mode of the fibre,
   the electromagnetic signals at said second wavelength ($\lambda_2$) propagating in a plurality of modes of the fibre, and
   means for detecting changes in an interference pattern produced by the interaction of the plurality of modes at the second wavelength ($\lambda_2$).

2. Monitoring apparatus as claimed in claim 1 in which said means for detecting includes imaging means for imaging at least a part of said interference pattern, and energy detection means for detecting changes in the energy in part of the interference pattern thus imaged.

3. Monitoring apparatus as claimed in claim 2 in which the imaging means comprises a lens.

4. Monitoring apparatus as claimed in claim 2 in which said energy detection means detect less than 10% of the interference pattern.

5. Monitoring apparatus as claimed in claim 1 in which said means for detecting changes includes means to provide an indication when the detected changes do not conform to permitted changes.

6. An optical communications system comprising:
   an optical demultiplexer couple to an optical fibre for demultiplexing electromagnetic signals at a first and a second wavelength $\lambda_1$, $\lambda_2$),
   the electromagnetic signals at said first wavelength ($\lambda_1$) propagating in a single mode of the fibre,
   the electromagnetic signals at said second wavelength ($\lambda_2$) propagating in a plurality of modes of the fibre,
   means for detecting changes in an interference pattern produced by the interaction of the plurality of modes at the second wavelength ($\lambda_2$),
   a first optical transmitter coupled to the optical fibre for transmitting data signals at the first wavelength ($\lambda_1$), and
   a second optical transmitting means coupled to the optical fibre for transmitting an optical signal at the second wavelength ($\lambda_2$).

7. An optical communications system as claimed in claim 6 wherein said means for detecting changes includes means responsive to nonpermitted changes for preventing said first optical transmitter from transmitting signals to said fibre.

8. A method of monitoring an optical communications system in which data-carrying electromagnetic signals at a first wavelength ($\lambda_1$) are conveyed in a single mode of an optical fibre comprising:
   transmitting an electromagnetic signal along the optical fibre at a second wavelength ($\lambda_2$) at which the optical fibre supports propagation in a plurality of modes;
   selectively extracting only the electromagnetic signals at the second wavelength ($\lambda_2$) from the optical fibre; and
   detecting changes in the interference pattern produced by the interaction of the plurality of modes at the second wavelength ($\lambda_2$).

9. A method of monitoring as claimed in claim 8 in which the step of detecting includes:
   imaging the interference pattern; and
   measuring changes in the energy in a part of said interference pattern.

10. A method of monitoring as claimed in claim 9 in which said part is less than 10% of the interference pattern.

* * * * *